United States Patent
Salesse-Lavergne

(10) Patent No.: US 10,723,482 B1
(45) Date of Patent: Jul. 28, 2020

(54) DIRECTIONAL LIGHTING FITTED TO AN AIRCRAFT, AND AN ASSOCIATED LIGHTING METHOD

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/708,942

(22) Filed: Dec. 10, 2019

(30) Foreign Application Priority Data

Jan. 31, 2019 (FR) ..................... 19 00910

(51) Int. Cl.
  *B64D 47/04* (2006.01)
  *F21V 21/15* (2006.01)
  *B64D 47/08* (2006.01)
(52) U.S. Cl.
  CPC ............. *B64D 47/04* (2013.01); *B64D 47/08* (2013.01); *F21V 21/15* (2013.01)
(58) Field of Classification Search
  CPC .......... B64D 47/04; B64D 47/08; F21V 21/15
  USPC ....................................................... 362/470
  See application file for complete search history.

(56) References Cited

U.S. PATENT DOCUMENTS

| | | | |
|---|---|---|---|
| 3,721,499 A | 3/1973 | Narbaits | |
| 9,944,405 B2 * | 4/2018 | Mouton | ................ B64C 27/006 |
| 10,189,579 B2 * | 1/2019 | Hessling-von Heimendahl | .......... B64D 47/06 |
| 10,583,936 B2 * | 3/2020 | Robledo Bueno | ..... H05B 45/10 |
| 2015/0146442 A1 * | 5/2015 | Bonnefous | ............ F21S 41/657 362/467 |
| 2018/0009546 A1 | 1/2018 | Filias et al. | |

FOREIGN PATENT DOCUMENTS

| | | |
|---|---|---|
| EP | 3231714 A1 | 10/2017 |
| FR | 3037042 A3 | 12/2016 |
| FR | 3053821 A1 | 1/2018 |
| WO | 2018035835 A1 | 3/2018 |

OTHER PUBLICATIONS

Le Troter, Arnaud et al. Soccer field detection in video images using color and spatial coherence. Image and Video Processing and Analysis, LSIS Laboratory. Oct. 2004. France, 9 pages.
French Search Report for French Application No. FR 1900910, Completed by the French Patent Office, dated Nov. 5, 2019, 8 pages.

* cited by examiner

*Primary Examiner* — Bryon T Gyllstrom
(74) *Attorney, Agent, or Firm* — Brooks Kushman P.C.

(57) ABSTRACT

A directional lighting system fitted to an aircraft and comprising firstly a light source mounted on a motor-driven support and secondly a control device serving to control the motor-driven support. According to the invention, such a directional lighting system comprises a selector member for selecting a pointing target that is to be pointed to, a camera for acquiring a plurality of images of the surroundings outside the aircraft, image processor means for identifying the selected pointing target, a calculation unit configured to calculate the current coordinates of the pointing target, and a servocontrol member of the control device for servocontrolling the position of the motor-driven support to occupy an angular orientation as determined by the calculation unit.

14 Claims, 2 Drawing Sheets

US 10,723,482 B1

DIRECTIONAL LIGHTING FITTED TO AN AIRCRAFT, AND AN ASSOCIATED LIGHTING METHOD

CROSS-REFERENCE TO RELATED APPLICATIONS

This application claims priority to French patent application No. FR 1900910 filed on Jan. 31, 2019, the disclosure of which is incorporated in its entirety by reference herein.

BACKGROUND OF THE INVENTION

(1) Field of the Invention

The present invention relates to a system and a method for providing directional lighting from an aircraft. In particular, such an aircraft may consist in an airplane, a rotorcraft, or any type of aircraft that is preferably capable of taking off and/or landing vertically.

Also, such aircraft may advantageously carry on board one or more pilots and/or passengers and/or goods.

More particularly, the invention relates to the field of lighting systems comprising a light source mounted on a motor-driven support presenting at least one degree of freedom to move in rotation relative to a fuselage of the aircraft, and at least one control device enabling the motor-driven support to be controlled to occupy at least one angular orientation, the angular orientation(s) being relative to a pointing direction of the light source in a first reference frame associated with the fuselage of the aircraft.

(2) Description of Related Art

In general manner, and as described in Documents FR 3 037 042 and U.S. Pat. No. 3,721,499, it is known to make devices for causing lighting to track automatically a pad site for take-off or landing of a rotorcraft. Under such circumstances, such a pad site may be formed by a landing zone arranged on the ground or in a reference frame of that is itself stationary relative to the ground.

Furthermore, that Document FR 3 037 042 also discloses the use of a system for measuring the altitude and the heading of the rotorcraft, a two-axis accelerometer, and a radio altimeter so as to know variations in the position of the rotorcraft relative to the pad site of coordinates that are constant in a reference frame associated with the ground.

Thus, such a tracking device obliges the pilot to perform a first step of initializing the position of a searchlight in order to pointed towards the pad site and then a storage step in order to store the initial position of the searchlight.

Consequently, such a device does not make it possible for the lighting to track automatically a pad site that is movable in the reference frame associated with the ground. By way of example, a movable landing and/or take-off site may be situated on an offshore platform, on a ship, or more generally on any type of vehicle that is moving relative to the ground.

Furthermore, as described in Document EP 3 231 714, it is also known to fit an aircraft with a camera to acquire a plurality of images of the surroundings outside the aircraft. Image processor means then serve to identify a focus of expansion between two images so as to make it possible to identify potential deviation of the approaching aircraft relative to a landing strip and to modify correspondingly the orientation direction in which a light source of a lighting system arranged on the aircraft is pointed.

Nevertheless, such image processor means serve to determine values of current components of a speed vector of the aircraft relative to the ground and then to steer the light source as a function of those values.

Consequently, and as above, such a device does not make it possible for the lighting to track automatically a pad site that is movable in the reference frame associated with the ground.

Furthermore, such a lighting system is more particularly adapted to enable an aircraft to provide lighting during a stage of landing on a strip or runway that is long and not a pad.

Furthermore, as described in particular in Documents FR 3 053 821 and WO 2018/035835, is also known to fit an aircraft such as a rotorcraft or a drone with a camera, with image processor means, and a calculation unit for calculating current coordinates of at least one landing zone in a reference frame associated with the rotorcraft. These current coordinates are determined from the plurality of images acquired by the camera.

Finally, in Document FR 3 053 821, a control unit serves to generate a control setpoint for automatically piloting the rotorcraft towards a desired landing zone.

Nevertheless, although such a device enables a rotorcraft to be piloted automatically towards a landing zone with a predetermined flight path, it does not serve to control the orientation of a light source pointed towards a landing zone, and consequently to track that landing zone automatically.

BRIEF SUMMARY OF THE INVENTION

An object of the present invention is thus to provide a lighting system making it possible to be unaffected by the above-mentioned limitations. Specifically, an object of the invention is to provide lighting and automatic tracking of a pointing target that may be movable in a reference frame associated with the ground, e.g. such as an offshore platform, a ship, or more generally any vehicle moving relative to the ground.

As mentioned above, the invention provides a directional lighting system fitted to an aircraft, the lighting system comprising:

at least one light source mounted on a motor-driven support, the motor-driven support presenting at least one degree of freedom to move in rotation relative to a fuselage of the aircraft;

a control device serving to control the motor-driven support to occupy at least one angular orientation, the orientation(s) being relative to a pointing direction of the light source(s) in a first reference frame associated with the fuselage of the aircraft.

According to the invention, such a directional lighting system is remarkable in that it comprises:

a selector member for selecting a pointing target that is to be pointed to by the pointing direction;

at least one camera for acquiring a plurality of images of the surroundings outside the aircraft in the pointing direction;

image processor means for identifying the pointing target, as selected by the selector member, in at least one image from among the plurality of images;

a calculation unit configured to calculate current coordinates of the pointing target as identified by the image processor means, the current coordinates being determined in the first reference frame from the plurality of images acquired by the camera(s), the calculation unit being configured to use the current coordinates of the pointing target to determine the angular orientation(s) in the first reference frame; and a servocontrol member of the control device to servocontrol the position of the motor-driven support to occupy the angular orientation(s) as determined by the calculation unit.

In other words, and by way of example, the selector member serving to select a pointing target may comprise a monitor screen displaying an image of one or more landing zones towards which the aircraft is heading. A pilot of the aircraft can then select the pointing target by using a finger to touch a touch-sensitive zone of the monitor screen associated with selecting the pointing target.

By way of example, such a monitor screen may be integrated in the control panel of the aircraft cockpit, or it may be a portable screen, such as a touch tablet, or indeed it may be remote from the aircraft when the aircraft is remotely controlled and consequently does not have a pilot on board.

Furthermore, the camera(s) may advantageously be arranged below a fuselage of the aircraft and may be stationary or steerable relative to the fuselage. In particular, the camera(s) may thus be selected to be of the "pan-tilt-zoom" type, i.e. firstly having two degrees of freedom to move in rotation through a bearing angle and an elevation angle relative to a travel direction of the aircraft, and secondly having the ability to magnify in the direction of the pointing target.

The images required by the camera(s) are then transmitted to the image processor means that are configured to identify the pointing target, as selected via the selector member, in at least one image from among the plurality of images. By way of example, such image processor means may comprise a computer, calculation means, a processor, an integrated circuit, a programmable system, or indeed a logic circuit.

Such identification of a selected pointing target is performed in a plurality of steps. Initially, it is possible to proceed with detecting a horizon line using a so-called "gradient" method. More precisely, such a method consists in using a vertical "Sobel" filter on an image. Such a method thus serves to amplify contrast and to detect horizontal lines. Thereafter, it suffices to find the straight line that passes through the greatest number of points by using a "Hough" transform. In practice, the horizon line in the image is not exactly a straight line, but rather an arc of a parabola.

Nevertheless, detecting the horizon line approximately is not troublesome, since detecting the horizon line serves only to eliminate the top portion of the image that corresponds to the sky and that is not useful for detecting the pointing target.

Furthermore, the angle of inclination of the aircraft about a roll axis is taken into account by the processor means using auxiliary on-board instruments giving the attitude of the aircraft at all times, consequently making it possible to determine the angle of rotation for obtaining an outstanding image corresponding to the horizontal attitude of the aircraft.

Once the horizon line has been identified and the sky eliminated, the processor means perform a so-called "by region" method as described for another application in a publication by Arnaud Le Troter, Sebastien Mavromatis, and Jean Sequeira, entitled "Soccer field detection in video images using color and spatial coherence—International Conference on Image Analysis and Recognition Porto, Portugal, October 2004".

Such a by region method then makes it possible to search for dominant colors in an image or a zone of interest by color distribution. That method also makes it possible to search for image zones that present color coherence, and then it makes use of an enlargement model on the pixels of the image. Such a model is known for recognizing color pixels making up images and can make use of a color representation space such as that known as hue, saturation, lightness (HSL).

Such a method by region makes it possible in particular to detect the sea in a low portion of the image lying below the horizon line, and the sky in the high portion of the image and arranged above the horizon line.

Thereafter, grouping the remaining pixels together in connected zones serves to obtain zones comprising one (or more) selected pointing targets. Any connected zones that are present in the sky only are removed, since they generally correspond to clouds, smoke, and flying objects, and do not correspond to potential pointing targets to be identified.

Coherence zones are formed by allocating an "HSL" zone to each pixel, or else no HSL zone whenever the color of the pixel does not lie in any of the dominant HSL zones (or dominant colors of the image). Thereafter, the processor means serve to create connected zones of pixels all belonging to the same HSL zone.

The phenomenon of enlarging a pixel to a zone is performed by applying a mathematical morphology tool corresponding to a closure. The structuring element selected for closure is a circle of size much smaller than the minimum sizes for the landing target(s) that it is desired to identify in the image. The size selected for the structuring element is of the order of one tenth the size of the objects to be detected.

The zones that are obtained are then identified as potential pointing targets and they may be displayed independently by the display means and then selected by the crew.

Thus, once the selected pointing target has been identified, the calculation unit then calculates current coordinates for the pointing target in the first reference frame associated with the fuselage of the aircraft, and it determines the angular orientation(s) in the first reference frame.

Like the above image processor means, such a calculation unit may, for example, comprise a computer, calculation means, a processor, an integrated circuit, a programmable system, or indeed a logic circuit.

Also, the image processor means and the calculation unit may be formed by mutually distinct elements, or indeed they may be the same as each other, e.g. constituting a single computer.

The servocontrol member then makes it possible at all times to modify the position of the motor-driven support so as to track the angular orientation(s) as determined by the calculation unit. Also, the motor-driven support may advantageously have two degrees of freedom to move in rotation through both an elevation angle and also a bearing angle relative to a travel direction of the aircraft. Under such circumstances, the position of the motor-driven support may be modified to occupy two distinct angular orientations, and at all times, the calculation unit determines a first angular orientation at an elevation angle and a second angular orientation at a bearing angle.

In practice, the servocontrol member may servocontrol the position of the motor-driven support to occupy the angular orientation(s) as determined by the calculation unit when the pointing target is selected via the selector member by a pilot of the aircraft.

Thus, as soon as the pointing target is selected by a pilot of the aircraft, the servocontrol member of the control device servocontrols the position of the motor-driven support to occupy at least the angular orientation(s) determined by the calculation unit.

Advantageously, the directional lighting system may include measurement means for measuring the values of the current components of a speed vector of the aircraft relative to the ground, the current components being determined in a second reference frame associated with the ground.

In particular, such measurement means may comprise a member for measuring the altitude and the heading of the aircraft, one or more accelerometers, and one or more satellite geolocation modules, such as a GPS module.

In an advantageous embodiment of the invention, the servocontrol member may servocontrol the position of the motor-driven support to occupy a predetermined angular orientation, the predetermined angular orientation being variable as a function of at least one of the values of the current components of the speed vector of the aircraft relative to the ground, the pointing direction of the light source(s) ranging from a minimum angle that is oriented downwardly, i.e. towards the ground, relative to a direction of advance of the aircraft, to a maximum downwardly oriented angle corresponding to a vertical direction parallel to a third axis of the first reference frame.

In other words, the servocontrol member serves to servocontrol the position of the motor-driven support to occupy a predetermined angular orientation of value that can vary as a function of one or more values of the current components of the speed vector of the aircraft relative to the ground. Under such circumstances, the aircraft then includes measurement means as described above for measuring the values of the current components of a speed vector.

Thus, during a stage of hovering flight of the aircraft, corresponding to current components of zero value for the speed vector of the aircraft relative to the ground, the servocontrol member may servocontrol the position of the motor-driven support so that the pointing direction of the light source(s) is downwardly oriented perpendicularly to a plane formed by a roll axis and by a pitching axis of the aircraft.

In contrast, during a stage of flight in which the speed vector of the aircraft relative to the ground presents non-zero current components, the servocontrol member serve to servocontrol the position of the motor-driven support so that the pointing direction of the light source(s) points downwards at an angle of 3° relative to the direction of advance and below the plane formed by a roll axis and by a pitching axis of the aircraft.

Advantageously, the directional lighting system may include a manual control member for controlling the servocontrol member to servocontrol the position of the motor-driven support to occupy the predetermined angular direction.

In other words, the manual control member can serve to pass from a first mode of servocontrolling the position of the motor-driven support to a second mode of servocontrolling the position of the motor-driven support.

In the first mode of servocontrol, the motor-driven support is servocontrolled to occupy the angular orientation(s) as determined by the calculation unit. In contrast, in the second mode of servocontrol, the servocontrol member serves to servocontrol the position of the motor-driven support to occupy the predetermined angular orientation, which may for example be stored in a storage unit on board the aircraft or in an external storage unit.

In an advantageous embodiment of the invention, the directional lighting system may include a manual corrector member for manually correcting the predetermined angular orientation of the motor-driven support.

By way of example, such a manual corrector member may be a joystick, or any other manual control member that is movable in both directions along at least one axis or that presents at least one degree of freedom to move in rotation while being movable in both directions of rotation. Such a manual corrector member is thus suitable for correcting the predetermined angular orientation of the motor-driven support in both directions of the degree(s) of freedom that it possesses, e.g. relative to an element of the aircraft cockpit.

Advantageously, the camera(s) may be arranged on the motor-driven support.

In other words, the camera(s) is/are movable together with the light source(s). In this way, the camera(s) can constantly track the pointing direction of the light source(s).

In practice, the directional lighting system may include a plurality of light sources surrounding the camera(s), the plurality of light sources being arranged coaxially around the camera(s) about the pointing direction.

Thus, by way of example, the lighting system may include a central camera with a plurality of light sources that may be regularly distributed around the central camera. Under such circumstances, the pointing direction of the assembly formed by the plurality of light sources then coincides with the orientation of an optical axis of the central camera.

Also, the plurality of light sources may be formed by light-emitting diodes (LEDs) arranged on a plane support and fed directly with electrical power in order to generate a light beam.

In an advantageous embodiment of the invention, the plurality of light sources may include a remote light generator together with bundles of optical fibers for conveying light from the light generator to the proximity of the camera (s).

Under such circumstances, the light generator may be arranged in a stationary zone of the aircraft, the stationary zone being secured to the fuselage of the aircraft and being arranged not on the motor-driven support. Thus, the bundles of optical fibers may serve to convey light all around the camera and very close to the camera.

Such an embodiment is advantageous since optical fibers present intrinsic flexibility and are suitable for deforming freely in order to track the movements of the motor-driven support. Furthermore, such optical fibers serve to convey a large quantity of light without generating heat in the proximity of the camera.

The present invention also provides a directional lighting method for an aircraft, the directional lighting method comprising at least:

a step of lighting at least one light source mounted on a motor-driven support, the motor-driven support presenting at least one degree of freedom to move in rotation relative to a fuselage of the aircraft;

a control step serving to control the motor-driven support to occupy at least one angular orientation, the orientation(s) being relative to a pointing direction of the light source(s) in a first reference frame associated with the fuselage of the aircraft.

According to the invention, the directional lighting method is remarkable in that it comprises a succession of steps comprising at least:

a selection step for selecting a pointing target that is to be pointed to by the pointing direction;

an acquisition step for acquiring a plurality of images of the surroundings outside the aircraft in the pointing direction;

an image processing step for identifying the pointing target, as selected in the selection step, in at least one image from among the plurality of images;

a calculation step configured to calculate current coordinates of the pointing target as identified during the image processing step, the current coordinates being determined in the first reference frame from the plurality of images acquired during the acquisition step, the calculation step being configured to use the current coordinates of the pointing target to determine the angular orientation(s) in the first reference frame; and a servocontrol step of servocontrolling a control device performing the control step, the servocontrol step serving to servocontrol the position of the motor-driven support to occupy at least the angular orientation(s) as determined during the calculation step.

In other words, and by way of example, the selection step serving to select a pointing target may be performed by means of a monitor screen displaying an image of one or more landing zones towards which the aircraft is heading. By way of example, the selection step may then be performed by a pilot of the aircraft using a finger to touch a touch-sensitive zone of the monitor screen associated with selecting the pointing target.

The acquisition step is performed by means of one or more cameras advantageously arranged under the fuselage of the aircraft and stationary or steerable relative to the fuselage. As mentioned above, the camera(s) may thus in particular be of the "pan-tilt-zoom" type.

The images acquired by the camera(s) are then transmitted to image processor means in order to perform the image processing step. Specifically, the image processor means are configured to identify the pointing target, as selected during the selection step, in at least one image from among the plurality of images. By way of example, such image processor means may comprise a computer, calculation means, a processor, an integrated circuit, a programmable system, or indeed a logic circuit.

When the selected pointing target is identified during the image processing step, the calculation step then serves to calculate the current coordinates of the pointing target in the first reference frame associated with the fuselage of the aircraft, and to determine the angular orientation(s) in the first reference frame.

Like the above image processing step, such a calculation step may be performed, for example, by a computer, calculation means, a processor, an integrated circuit, a programmable system, or indeed a logic circuit.

As mentioned above, the image processing step and the calculation step may be performed by elements that are mutually distinct, or else by elements that are the same as each other, in which case they form a single computer, for example.

The servocontrolling step may modify the position of the motor-driven support so as to track the angular orientation(s) as determined during the preceding calculation step. Also, the motor-driven support may advantageously have two degrees of freedom to move in rotation through both an elevation angle and also a bearing angle relative to a travel direction of the aircraft. Under such circumstances, the position of the motor-driven support may be modified to occupy two distinct angular orientations, and at all times, the calculation unit determines a first angular orientation at an elevation angle and a second angular orientation at a bearing angle.

Advantageously, the directional lighting method may include a measurement step for measuring the values of the current components of a speed vector of the aircraft relative to the ground, the current components being determined in a second reference frame associated with the ground.

In particular, such a measuring step may make use of a member for measuring the altitude and the heading of the aircraft, one or more accelerometers, and one or more satellite geolocation modules, such as a GPS module.

In an advantageous implementation of the invention, the servocontrol step may servocontrol the position of the motor-driven support to occupy a predetermined angular orientation at least prior to performing the selection step, the predetermined angular orientation being variable as a function of at least one of the values of the current components of the speed vector of the aircraft relative to the ground as measured in the measurement step, the pointing direction of the light source(s) ranging from a minimum angle that is downwardly oriented relative to a direction of advance of the aircraft, to a maximum downwardly oriented angle corresponding to a vertical direction parallel to a third axis of the first reference frame.

In other words, prior to the step of the pilot selecting the pointing target, the predetermined angular orientation of the motor-driven support may vary automatically as a function of at least one of the values of the current components of the speed vector of the aircraft relative to the ground. Under such circumstances, such servocontrol of the position of the motor-support to occupy a predetermined angular position may correspond to an initial mode of servocontrol.

Advantageously, after performing the selection step, the directional lighting method may include a manual control step for controlling the servocontrol step serving to servocontrol the position of the motor-driven support to occupy the predetermined angular orientation.

In other words, and by way of example, this manual control step enables the pilot of the aircraft to go from a first mode of servocontrolling the position of the motor-driven support to a second mode of servocontrolling the position of the motor-driven support. Also, such a second mode of servocontrol may correspond to the initial mode of servocontrol that is performed prior to the first mode of servocontrolling the position of the motor-driven support.

In practice, the directional lighting method may include a manual correction step for manually correcting the predetermined angular orientation of the motor-driven support.

Thus, by way of example, such a manual correction step may be performed by actuating a joystick, or any other manual control member that is movable in both directions along at least one axis or that presents at least one degree of freedom to move in rotation while being movable in both directions of rotation. Such a manual correction step then makes it possible to correct the predetermined angular orientation of the motor-driven support in both directions of the degree(s) of freedom that it possesses, e.g. relative to an element of the aircraft cockpit.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

As mentioned above, the invention relates to a directional lighting system for fitting to an aircraft.

Figure 1:
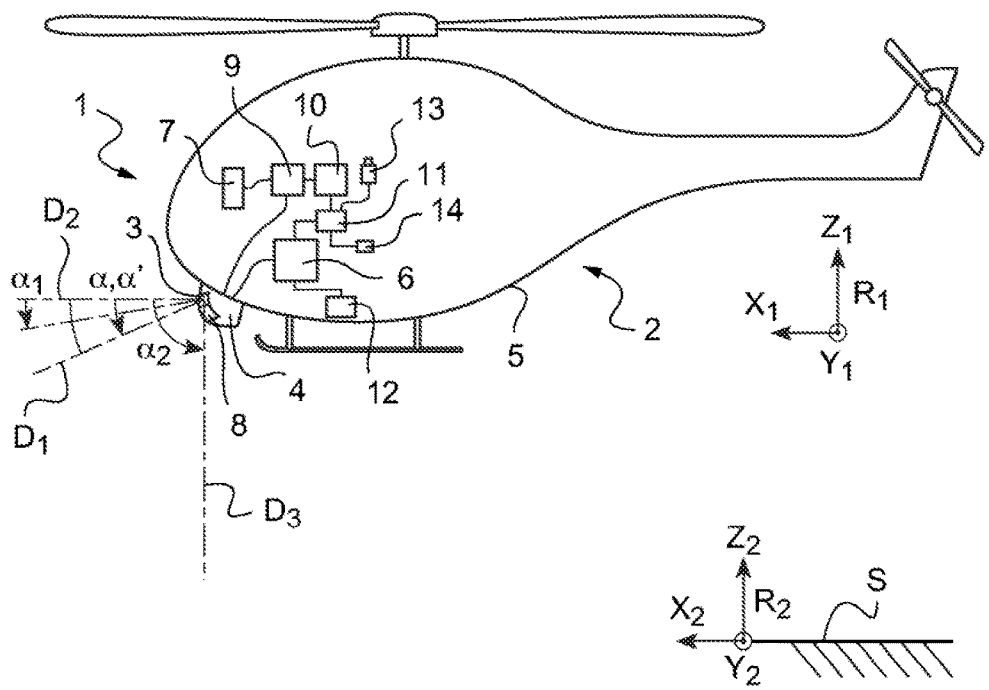
FIG. 1, is a side view of an aircraft fitted with a directional lighting system in accordance with the invention.

As shown in FIG. 1, such a directional lighting system 1 may be mounted on an aircraft and serve to light a pointing target, in particular such as a landing zone.

Thus, the directional lighting system 1 has at least one light source 3 mounted on a motor-driven support 4. Also, such a motor-driven support 4 presents at least one degree of freedom to move in rotation relative to a fuselage 5 of the aircraft 2, and preferably two degrees of freedom to move in rotation relative to the fuselage 5.

The directional lighting system 1 also has a control device to 6 for controlling movements of the motor-driven support 4 to occupy at least one angular orientation, and preferably to occupy two angular orientations $\alpha$, $\beta$, $\alpha'$, $\beta'$. This, or these, angular orientation(s) $\alpha$, $\beta$, $\alpha'$, $\beta'$ is/are then relative to a pointing direction D1 of the light source(s) 3 in a first reference frame R1 associated with said fuselage 5 of the aircraft 2.

By way of example, such a first reference frame R1 may comprise a first axis $OX_1$ aligned with a heading axis of the aircraft 2 arranged substantially horizontally and capable of being offset through a drift angle relative to a direction of advance D2 of the aircraft 2. The reference frame R1 then also has a second axis $OY_1$ likewise arranged horizontally, being perpendicular to the first axis $OX_1$. Finally, the reference frame R1 has a third axis $OZ_1$ arranged vertically and thus being perpendicular to both the first and second axes $OX_1$ and $OY_1$.

Furthermore, the directional lighting system 1 includes a selector member 7 enabling a pilot of the aircraft to select a pointing target to which the light source(s) 3 is/are to point, and thus to which the pointing direction D1 is to point.

As shown, the directional lighting system 1 includes at least one camera 8 likewise mounted on the motor-driven support 4 and serving to acquire a plurality of images of the surroundings outside the aircraft 2 in the pointing direction D1.

Image processor means 9 arranged on the aircraft 2 then serve to identify the pointing target, as selected by the selector member 7, in at least one of the images from among the images acquired by the camera 8.

A calculation unit 10, which may likewise be arranged on the aircraft 2, is then configured to calculate current coordinates of the pointing target as identified by the image processor means 9. Such a current coordinates are then determined in the first reference frame R1 from the images acquired by the camera 8. Thereafter, the calculation unit 10 is configured to use the current coordinates of the pointing target to determine the angular orientation $\alpha$ in the first reference frame R1.

Furthermore, the directional lighting system 1 also includes a servocontrol member 11 of the control device 6 serving to servocontrol the position of the motor-driven support 4 to occupy the angular orientation $\alpha$ determined by the calculation unit 10.

Furthermore, and as shown, the directional lighting system 1 includes measurement means 12 arranged on the aircraft 2 to measure the values of current components of a speed vector of the aircraft 2 relative to the ground S, these current components being determined in a second reference frame R2 associated with the ground S.

By way of example, such a reference frame R2 may include a first axis $OX_2$ arranged substantially horizontally and pointing along a first direction. The reference frame R2 then also has a second axis $OY_2$ likewise arranged horizontally, being perpendicular to the first axis $OX_2$. Finally, the reference frame R2 has a third axis $OZ_2$ arranged vertically and thus being perpendicular to the first and second axes $OX_2$ and $OY_2$.

Advantageously, the directional lighting system 1 may also include a manual control device 13, which may for example be arranged on the aircraft 2 or else be located remotely on the ground. Such a manual control member 13 then serves to control the servocontrol member 11 to servocontrol the position of the motor-driven support 4 to occupy a predetermined angular orientation $\alpha'$. Such a predetermined angular orientation $\alpha'$ is then potentially distinct from the angular orientation $\alpha$ determined by the calculation unit 10 in the first reference frame R1.

Also, such a predetermined angular orientation $\alpha'$ may be variable as a function of at least one of the values of the current components of the speed vector of the aircraft 2 relative to the ground S. Under such circumstances, the pointing direction D1 of the light source 3 may then range from a minimum angle $\alpha_1$ that is oriented downwardly, i.e. towards the ground, relative to a direction of advance D2 of the aircraft 2, to a maximum angle $\alpha_2$ oriented downwards and corresponding to a vertical direction D3 parallel to the third axis $OZ_1$ of the first reference frame R1.

Furthermore, and as shown, the directional lighting system 1 may also include a manual correction member 14 making it possible, if necessary, to correct manually the predetermined angular orientation $\alpha'$ of the motor-driven support 4.

Figure 2:
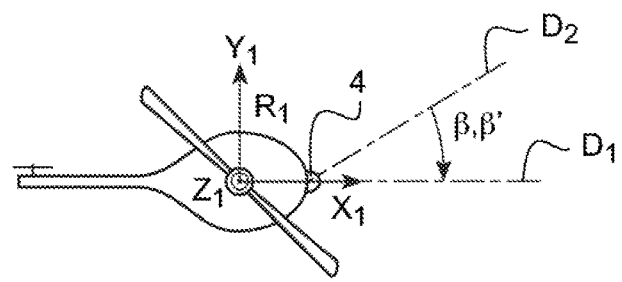
FIG. 2, is a plan view of an aircraft fitted with a directional lighting system in accordance with the invention.

As shown in FIG. 2, the servocontrol member 11 serves to servocontrol the position of the motor-driven support 4 to occupy an angular orientation $\beta$ determined by the calculation unit 10 or indeed to occupy a predetermined angular orientation $\beta'$. Such a predetermined angular orientation $\beta'$ is then potentially distinct from the angular orientation $\alpha$ determined by the calculation unit 10 in the first reference frame R1.

Advantageously, the predetermined angular orientations $\alpha'$, $\beta'$ may be direct functions of the values of the current components of the speed vector of the aircraft 2 relative to the ground S, and thus relative to the reference frame R2.

More precisely, the predetermined angular orientation $\beta'$ may be a function of the values of the horizontal components Vx and Vy of the speed vector of the aircraft 2 along the first axis $OX_2$ and the second axis $OY_2$, while the predetermined angular orientation $\alpha'$ may be a function of the value of a vertical component Vz of the speed vector of the aircraft 2 along a third axis $OZ_2$.

Also, when the horizontal components Vx and Vy of the speed vector of the aircraft 2 are zero and when the vertical component Vz along the third axis $OZ_2$ exceeds a predetermined threshold value Vzs, the predetermined angular orientation $\alpha'$ may then be maintained equal to the maximum angle $\alpha_2$. By way of example, such a predetermined threshold value Vzs may be selected to be negative, e.g. lying in the range −0.5 to −2.

In other words, the vertical component Vz along the third axis $OZ_2$ may be upwardly limited to a predetermined negative threshold value so that the searchlight points downwards during hovering. Such a predetermined threshold value Vzs may thus lie for example in the range −0.5 to −2.

Figure 3:
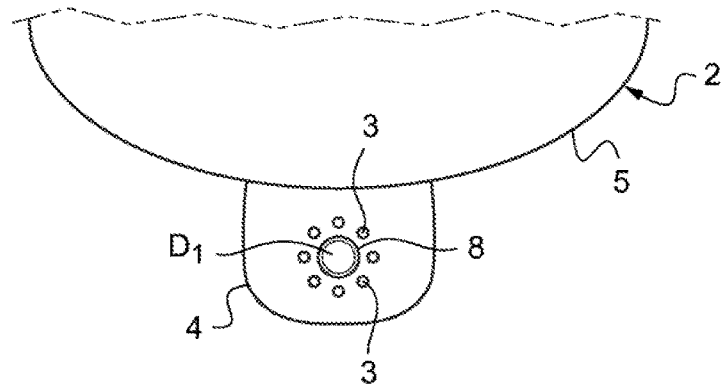
FIG. 3, is a front view of a first variant of a directional lighting system in accordance with the invention.

Furthermore, and as shown in FIG. 3, such a directional lighting system 1 may include a plurality of light sources 3 surrounding a camera 8, being arranged on the motor-driven support 4. These light sources 3 then advantageously form a monolithic unit arranged coaxially around the camera 8 about the pointing direction D1.

Figure 4:
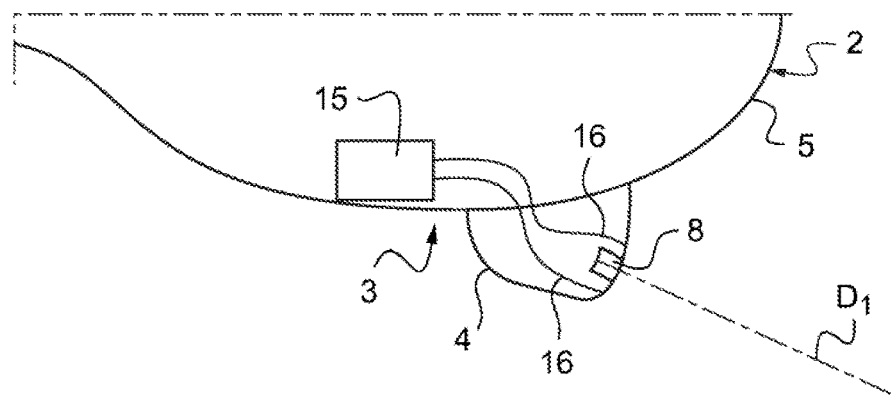
FIG. 4, is a side view of a second variant of a directional lighting system in accordance with the invention.

As shown in FIG. 4, the plurality of light sources 3 may also include a light generator 15 located remotely from the motor-driven support 4. By way of example, such a light generator 15 may be secured to the fuselage 5 of the aircraft 2. The plurality of light sources 3 also includes bundles of optical fibers 16, thus serving to convey light from the light generator 15 to around the camera 8 arranged on the motor-driven support 4.

Figure 5:
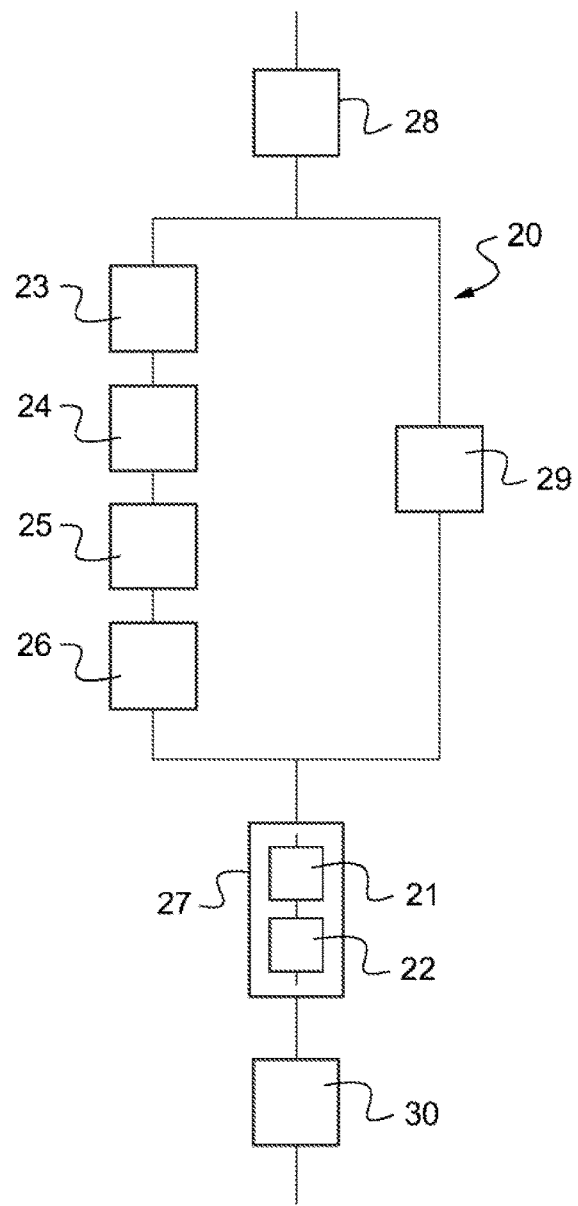
FIG. 5, is a flowchart showing steps of a directional lighting method in accordance with the invention.

As shown in FIG. 5, and as mentioned above, the invention also relates to a directional lighting method 20 for an aircraft 2.

Also, such a directional lighting method 20 may advantageously include a measurement step 28 serving to measure the values of the current components of a speed vector of the aircraft 2 relative to the ground S. These current components are then determined in the second reference frame R2 associated with the ground S.

The directional lighting method 20 may then include in parallel a succession of steps 23, 24, 25, and 26 corresponding to a first mode of operation, or a step 29 corresponding to a second mode of operation.

Thus, in the first mode of operation, a selection step 23 enables at least a pilot of the aircraft 2 to select a pointing target that is to be pointed to by a pointing direction D1 corresponding to the orientation of a light source 3 in a first reference frame the R1 associated with the fuselage 5 of the aircraft 2.

Thereafter, an acquisition step 24 is performed by at least one camera 8 and serves to acquire a plurality of images of the surroundings outside the aircraft 2 in the pointing direction D1.

The directional lighting method 20 also includes an image processing step 25 for identifying the pointing target, as selected in the selection step 23, in at least one of the plurality of images. Finally, a calculation step 26 is configured to calculate the current coordinates of the pointing target as identified during the image processing step 25. Also, such current coordinates are determined in the first reference frame R1 from a plurality of images acquired during the acquisition step 24.

Furthermore, the calculation step 26 is configured to use the current coordinates of the pointing target to determine at least one angular orientation $\alpha$, $\beta$ of a motor-driven support 4 in the first reference frame R1, the light source 3 being mounted on the motor-driven support 4. Also, such a motor-driven support 4 presents at least one degree of freedom to move in rotation relative to a fuselage 5 of the aircraft 2.

Finally, in this first mode of operation, the directional lighting method 20 includes a servocontrol step 27 for servocontrolling a control device 6 performing a step 21 of lighting the light source 3 and a control step 22 enabling the moto-driven support 4 to be controlled to occupy at least one angular orientation $\alpha$, $\beta$, $\alpha'$, $\beta'$ relative to the pointing direction D1.

Thus, in this first mode of operation, such a servocontrol step 27 enables the position of the motor-controlled support 4 to be servocontrolled to occupy the angular orientation $\alpha$, $\beta$ as determined during the calculation step 26.

Furthermore, the directional lighting method 20 may also include a second mode of operation in which the servocontrol step 27 serves to servocontrol the position of the motor-driven support 4 to occupy a predetermined angular orientation $\alpha'$, $\beta'$ that may advantageously be variable as a function of the values of the current components of a speed vector of the aircraft 2 relative to the ground S.

This predetermined angular orientation $\alpha'$, $\beta'$ may then be different from the angular orientation $\alpha$, $\beta$ as determined during the calculation step 26 that corresponds to the first mode of operation.

Also, in order to engage the second mode of operation, the directional lighting method 20 may then include a manual control step 29 for configuring the servocontrol step 27 so as to servocontrol the position of the motor-driven support 4 to occupy a predetermined angular orientation $\alpha'$, $\beta'$.

Finally, such a directional lighting method 20 may advantageously include a manual correction step 34 manually correcting the predetermined angular orientation $\alpha'$, $\beta'$ of the motor-driven support 4.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A directional lighting system fitted to an aircraft, the directional lighting system comprising:
   at least one light source mounted on a motor-driven support, the motor-driven support presenting at least one degree of freedom to move in rotation relative to a fuselage of the aircraft;
   a control device serving to control the motor-driven support to occupy at least one angular orientation, the at least one angular orientation being relative to a pointing direction of the light source(s) in a first reference frame associated with the fuselage of the aircraft;
   wherein the directional lighting system comprises:
   a selector member for selecting a pointing target that is to be pointed to by the pointing direction;
   at least one camera for acquiring a plurality of images of the surroundings outside the aircraft in the pointing direction;
   image processor means for identifying the pointing target, as selected by the selector member, in at least one image from among the plurality of images;
   a calculation unit configured to calculate current coordinates of the pointing target as identified by the image processor means, the current coordinates being determined in the first reference frame from the plurality of images acquired by the at least one camera, the calculation unit being configured to use the current coordinates of the pointing target to determine the at least one angular orientation in the first reference frame; and
   a servocontrol member of the control device to servocontrol a position of the motor-driven support to occupy at least the at least one angular orientation as determined by the calculation unit.

2. The system according to claim 1, wherein the servocontrol member servocontrols the position of the motor-driven support to occupy the at least one angular orientation as determined by the calculation unit when the pointing target is selected via the selector member by a pilot of the aircraft.

3. The system according to claim 1, wherein the directional lighting system includes measurement means for measuring values of current components of a speed vector of the aircraft relative to the ground, the current components being determined in a second reference frame associated with the ground.

4. The system according to claim 3, wherein the servocontrol member servocontrols the position of the motor-driven support to occupy a predetermined angular orientation, the predetermined angular orientation being variable as a function of at least one of the values of the current components of the speed vector of the aircraft relative to the ground, the pointing direction of the at least one light source ranging from a minimum angle that is downwardly oriented relative to a direction of advance of the aircraft, to a maximum downwardly oriented angle corresponding to a vertical direction parallel to a third axis of the first reference frame.

5. The system according to claim 4, wherein the directional lighting system includes a manual control member for controlling the servocontrol member to servocontrol the position of the motor-driven support to occupy the predetermined angular direction.

6. The system according to claim 4, wherein the directional lighting system includes a manual corrector member for manually correcting the predetermined angular orientation of the motor-driven support.

7. The system according to claim 1, wherein the at least one camera is arranged on the motor-driven support.

8. The system according to claim 7, wherein the directional lighting system includes a plurality of light sources surrounding the at least one camera, the plurality of light sources being arranged coaxially around the at least one camera about the pointing direction.

9. The system according to claim 8, wherein the plurality of light sources includes a remote light generator together with bundles of optical fibers for conveying light from the light generator to the proximity of the at least one camera.

10. A directional lighting method for an aircraft, the directional lighting method comprising at least:
a step of lighting at least one light source mounted on a motor-driven support, the motor-driven support presenting at least one degree of freedom to move in rotation relative to a fuselage of the aircraft;
a control step serving to control the motor-driven support to occupy at least one angular orientation, the at least one angular orientation being relative to a pointing direction of the at least one light source in a first reference frame associated with the fuselage of the aircraft;
wherein the directional lighting method comprises a succession of steps comprising at least:
a selection step for selecting a pointing target that is to be pointed to by the pointing direction;
at least one acquisition step for acquiring a plurality of images of the surroundings outside the aircraft in the pointing direction;
an image processing step for identifying the pointing target, as selected in the selection step, in at least one image from among the plurality of images;
a calculation step configured to calculate current coordinates of the pointing target as identified during the image processing step, the current coordinates being determined in the first reference frame from the plurality of images acquired during the acquisition step, the calculation step being configured to use the current coordinates of the pointing target to determine the at least one angular orientation in the first reference frame; and
a servocontrol step of servocontrolling a control device performing the control step, the servocontrol step serving to servocontrol a position of the motor-driven support to occupy at least the at least one angular orientation as determined during the calculation step.

11. The method according to claim 10, wherein the directional lighting method includes a measurement step for measuring values of current components of a speed vector of the aircraft relative to the ground, the current components being determined in a second reference frame associated with the ground.

12. The method according to claim 11, wherein the servocontrol step servocontrols the position of the motor-driven support to occupy a predetermined angular orientation at least prior to performing the selection step, the predetermined angular orientation being variable as a function of at least one of the values of the current components of the speed vector of the aircraft relative to the ground as measured in the measurement step, the pointing direction of the at least one light source ranging from a minimum angle that is downwardly oriented relative to a direction of advance of the aircraft, to a maximum downwardly oriented angle corresponding to a vertical direction parallel to a third axis of the first reference frame.

13. The method according to claim 12, wherein after performing the selection step, the directional lighting method includes a manual control step for controlling the servocontrol step serving to servocontrol the position of the motor-driven support to occupy the predetermined angular orientation.

14. The method according to claim 12, wherein the directional lighting method includes a manual correction step for manually correcting the predetermined angular orientation of the motor-driven support.

* * * * *